Dec. 19, 1944.          R. T. ANDERSON          2,365,442
                        OIL SETTLING TANK
                      Filed Feb. 2, 1942          4 Sheets-Sheet 1

INVENTOR
RAYMOND T. ANDERSON
BY
*Hyde and Meyer*
ATTORNEYS

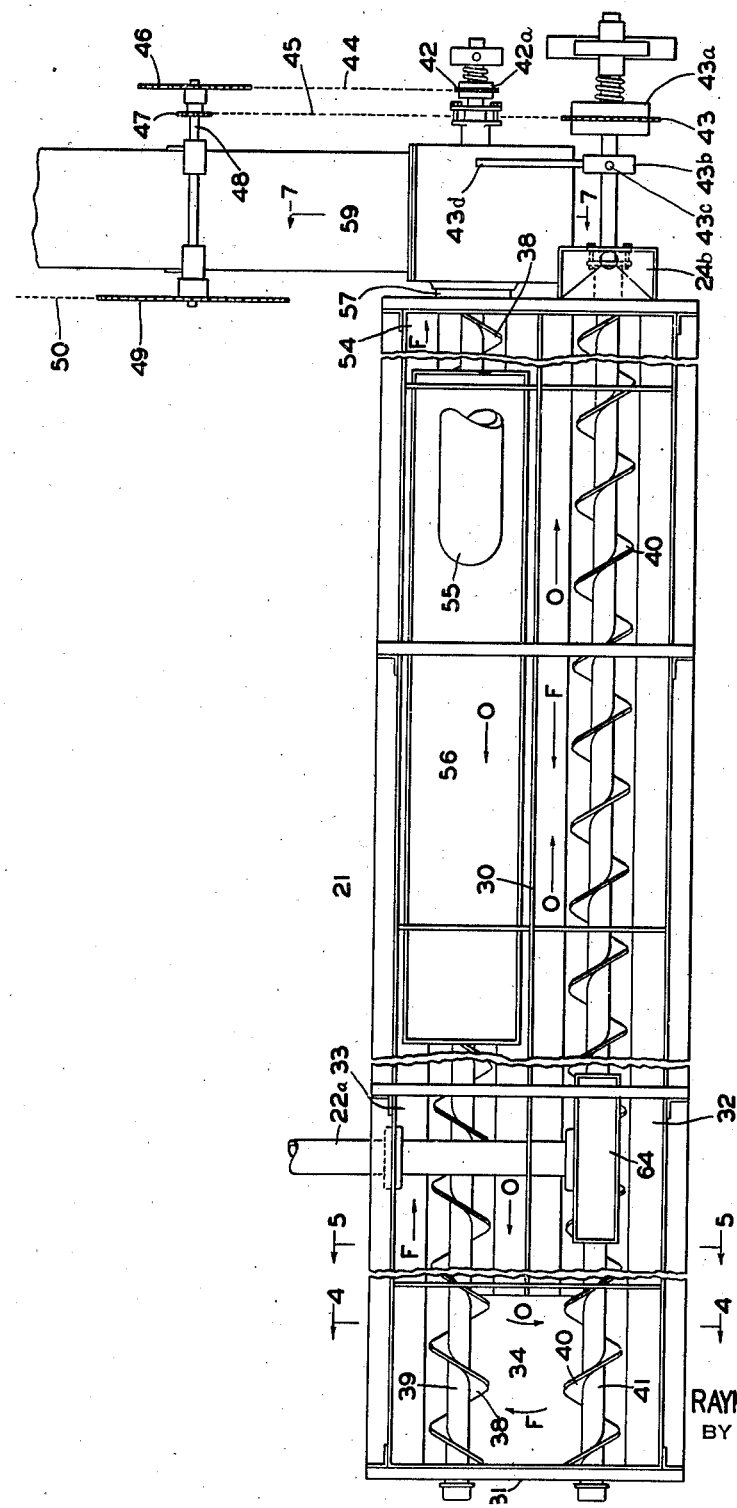

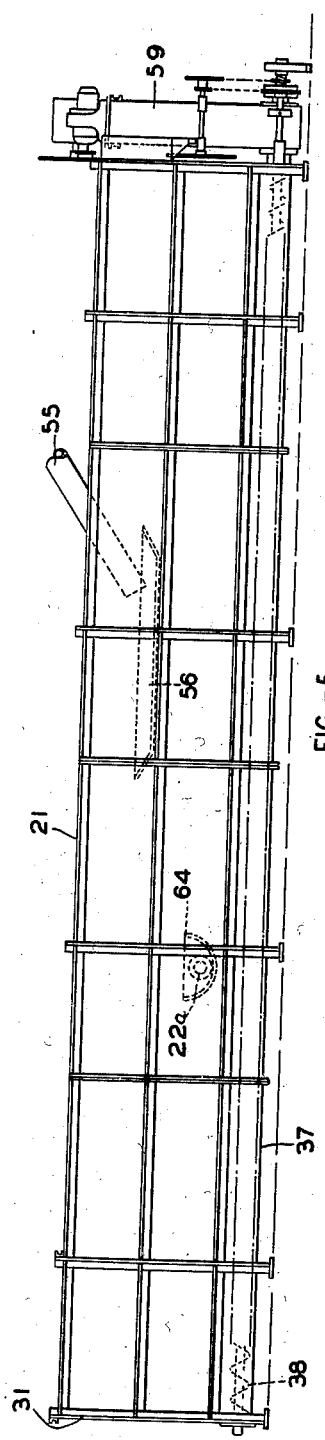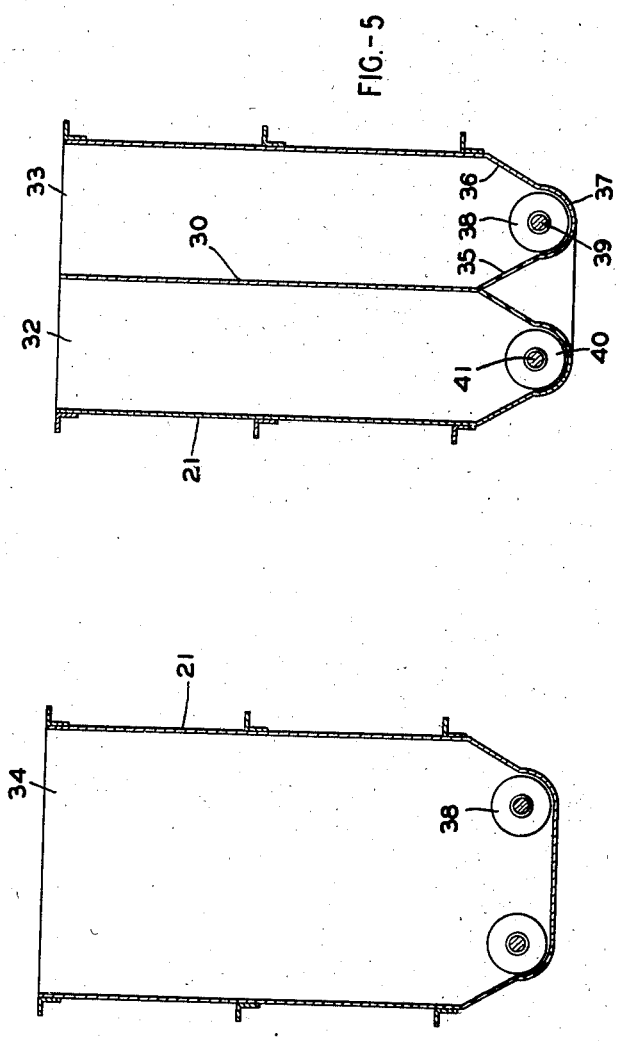

Dec. 19, 1944.   R. T. ANDERSON   2,365,442
OIL SETTLING TANK
Filed Feb. 2, 1942   4 Sheets-Sheet 4

INVENTOR
RAYMOND T. ANDERSON
BY
*Hyde and Meyer*
ATTORNEYS

Patented Dec. 19, 1944

2,365,442

UNITED STATES PATENT OFFICE 2,365,442

OIL SETTLING TANK

Raymond T. Anderson, Berea, Ohio, assignor to The V. D. Anderson Company, Cleveland, Ohio, a corporation of Ohio Application February 2, 1942, Serial No. 429,137

3 Claims. (Cl. 100—50)

The invention relates to a novel and improved apparatus for the clarification of liquid expressed from liquid bearing materials. It particularly relates to apparatus of this nature for removing the foots from oils expressed from proteinaceous substances of animal or vegetable origin such as pork, beef, cottonseed, copra, soya beans and the like.

As is well known in the art, present commercial processes for expressing fluids from fluid bearing material of the nature specified are usually effected by subjecting such material to gradually increasing heavy pressures while advancing it through one or more successive pressure chambers, the oil or liquid being squeezed out through slots or perforations in the chamber walls while the solid matter is ejected and is moved away by a worm conveyor or otherwise at the discharge end. Such processes, and the apparatus therefor, need not be here described in greater detail, being fully disclosed in a number of United States patents, for instance the Anderson Patent No. 2,216,658, granted October 1, 1940, or Hiller Patent 2,149,736, granted March 7, 1939.

The oil thus ejected usually carries in suspension therein relatively fine particles of solid matter known as foots. The presence of such solid matter in the final oil product generally is objectionable, and various steps have been taken towards its elimination, the preferred method utilizing screens of fine mesh intended to intercept and retain a large proportion of the foots while permitting the clarified oil to pass therethrough, followed by filtering through the cloths of a filter press. To prevent blocking the screens by an accumulation of foots they frequently have been vibrated or shaken by suitable mechanism during the screening process but this has a rather destructive effect on the screens, the bearings, and the various structural elements subjected to vibration. Even while undergoing such vibration the screens frequently become blocked, resulting not only in a relatively high maintenance cost because of cleaning operations, but also involving failure of the fine wires composing the mesh. Frequent inspections and renewals are therefore required when this screening operation is practiced, thereby increasing the ultimate production cost.

Another expedient which at times has been resorted to consists of permitting the expressed oil to stand in settling tanks for twenty-four hours to a week or more, so that a substantial portion of the foots may settle to the bottom and the upper layers of oil may be tapped off. This sometimes produces a good grade of oil but more often not, on account of the long time involved, but it always entails the necessity of providing floor space and tank capacity adequate to handle the continuous output of a plurality of presses such as are usually employed in a plant of any magnitude, especially when the oil used for cooling the press barrels is added to the oil expressed from the product being processed. Each such press requires twenty-five to thirty-five gallons of cooled oil per minute, while the product oil will vary from one-half gallon to three gallons depending on the oil content of the material being pressed. This greatly increased the volume of oil to be settled, even to ten (10) to sixty (60) times as much.

Manufacturers have heretofore attempted to solve this settling problem by making the process continuous, that is to say, by permitting the output from a press to enter a tank, while continuously drawing off from the tank a portion of the oil which presumably already has undergone some settling. It is obvious that with a small settling tank the oil "turnover" is so rapid as to permit no adequate settling time, while if the entry and withdrawal of oil are materially restricted the settling tank output cannot keep pace with the output of even a single press when the cooling oil is added to oil being produced. On the other hand, if the settling tank is made so large that it can handle the output of a press and the cooling oil in addition, and simultaneously permit such retarded progress of the oil therethrough as to allow sufficient settling time, it is found that the tank dimensions are such as to be prohibitive, especially since a battery of such tanks must be provided for a battery of presses.

If a single large tank of, say, 600 units of capacity is provided for 6 presses, the problem is still the same as when a 100 unit tank is provided for one press, namely, the oil turnover is too rapid for efficient settling, or the output is unable to keep in step with the press production, or the plant area occupied by the tank space dwarfs, by comparison, the area required for other apparatus, and greatly increases the construction and maintenance costs.

I have devised a method and means by which foots are removed more effectively than heretofore by a settling step which entirely dispenses with the screening operation, but without unduly increasing the amount of space required for the settling unit, while affording ample time for the settling operation, and yet efficiently handling the output from a plurality of presses.

One important object of the invention, therefore, is to provide improved method and apparatus of the character described, including a large settling tank of such size and shape that it fits neatly into space usually available in a mill operating a battery of these presses, and which tank is provided with flow and drainage connections to permit circulation of the required large quantity of cooling oil, and slow travel for a long period along a straight line of the product oil, but without turbulence of any oil, together with automatic removal or separation of the foots in a manner to eliminate the screening operation.

A further object of the invention is to provide improved method and apparatus of the character described, in which the settling operation is so effective in its removal of foots that the task of removing very fine solid material, which is accomplished in the filter press, is very materially reduced, thereby considerably reducing the frequency of cleansing of the filter cloths, such as by extending the periods between cleansing from every six hours to as much as every twenty-four hours or even only once a week.

Further objects of the invention are in part obvious and in part will appear more fully hereinafter.

The invention will be more fully understood from the following description, read in conjunction with the attached drawings, in which Fig. 1 is a top plan view, diagrammatic in character, showing a battery of oil presses, a settling unit therefor, and other auxiliary equipment to be later identified;

Fig. 3 is a top plan view, somewhat enlarged, showing details of the settling unit of Fig. 1;

Fig. 4 is a section taken on the line 4—4 of Fig. 3;

Fig. 5 is a section taken on the line 5—5 of Fig. 3;

Fig. 5a is a side elevation of the settling tank;

Before the present invention is described in detail, it is to be understood that such invention is not limited to the details of construction or the specific arrangement of parts herein illustrated or described, as the invention obviously may take other forms. It also is to be understood that the phraseology or terminology herein employed is for the purpose of description and not of limitation.

The invention illustrated in the attached drawings will be described in connection with the process of producing cottonseed oil, although not limited to any particular material.

Figure 1:
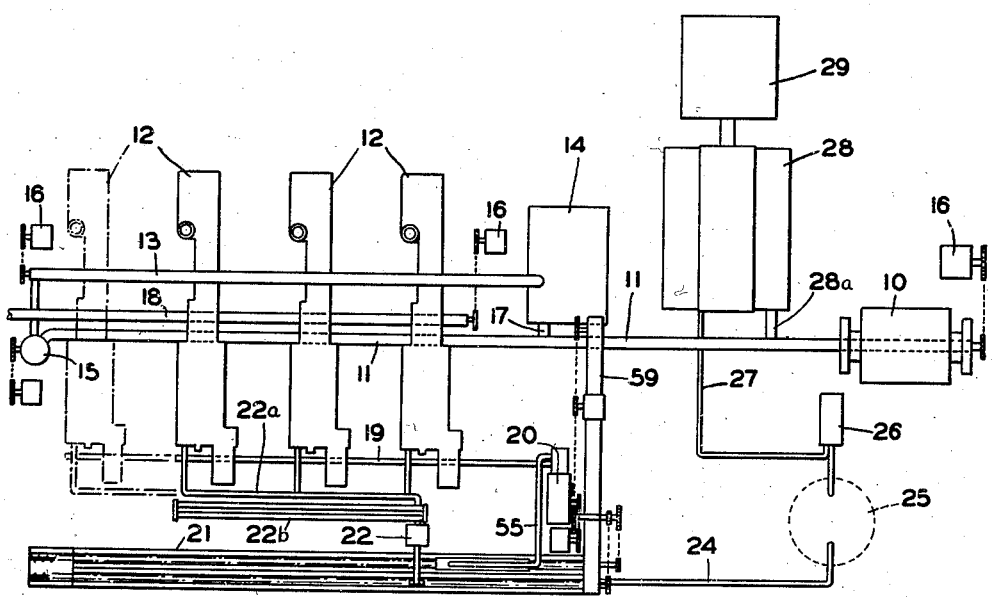
Figure 2:
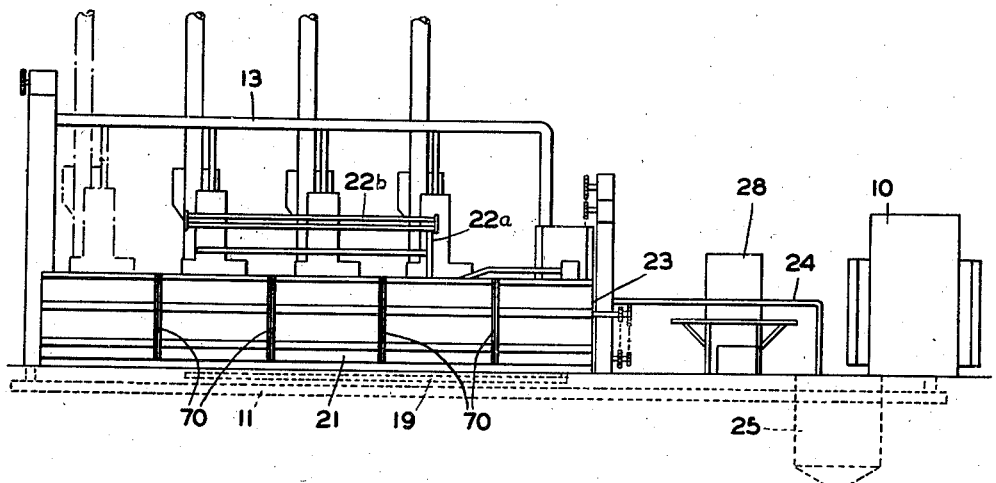
Fig. 2 is a view in side elevation of the equipment shown in Fig. 1.

Referring first to Figs. 1 and 2, the oil bearing material, such as cottonseed meats, may first be passed through a rolling mill 10, or other suitable crushing or grinding device, to comminute the material to preliminary form and crack the outer skin or shell to prepare the material for cooking or conditioning. The meats are then carried by means of a suitable conveyor 11 to the rotor lift 15 and thence by conveyor 13 to the receiving hoppers of a series of presses 12 which may be of conventional construction such as shown in the aforesaid patents. Three such presses are here shown in full lines, but this number may be increased or decreased as the occasion warrants. Any surplus of meats which at the moment exceeds the capacity of the presses is carried by conveyor 13 to an overflow storage bin 14. Any desired change of level in the overflow storage bin 14 can be secured by a conventional screw feeder 17. Suitable driving means 16 may be operatively geared or connected by belts, chains or otherwise to the various moving elements such as lifts, rotary conveyors, rolling mill, etc.

The meats are treated in conventional manner in presses 12, each of which usually includes its own preliminary cooker or conditioner, or a single cooker may supply several presses. From each press the solid by-product or oil cake is removed by conveyor 18, and the expressed oil, containing therein a certain proportion of suspended solid matter, or foots, and also the cooling oil, as in said Anderson patent, travels by gravity or power conveyor 19 to a bucket elevator 20 or other suitable lifting means whereby it is discharged by pipe 55 into the receiving end portion of the channel of a settling tank 21 of novel construction, described more fully hereinafter in connection with Figs. 3, 4, 5 and 6.

The oil stream discharged into the settling tank flows along the channel thereof and is withdrawn therefrom in two separate portions at two points. First, at a point located about one-half to three-fourths of the length of the channel away from the point of oil entry thereto, a large proportion of the total oil is withdrawn by a pump 22 and is conveyed by conduit 22a to a suitable heat exchanger or cooler 22b which reduces its temperature to a suitable value. From the cooler this oil flows by a continuation of conduit 22a, and the necessary branches thereof, to the several presses 12, where it is caused to flow down over the press barrels for cooling purposes, after which it is returned to the settling tank through conduit 19, as described, along with the oil just expressed. The cooling oil is recirculated, in the manner described, over and over again. In quantity it is large as compared with the product oil finally withdrawn permanently from the system. Indeed, the cooling oil, in volume, may be as much as ten to sixty times as much as the product oil.

Second, the oil forming the eventual product overflows a weir 24a at the discharge end 23 of the channel of the settling tank, or is piped off, and proceeds by means of a conduit 24 to a holding tank 25, whence it may be impelled by a pump 26 through conduit 27 to a filter press 28 where final traces of suspended matter or foots, within practical limits, may be removed. Filtering is not always necessary, however, and may be dispensed with in some cases. But, always, the removal of foots by settling is so much more efficient than the screening operation that filter cloths when used require cleansing only once a day or once a week, instead of every five to six hours, as heretofore. The filtered oil may be stored in tank 29. The foots from filter press 28 are fed back continuously by feeder 28a into meats conveyor 11 and re-pressed in presses 12.

The settling tank embodying novel design and structural characteristics comprises an elongated relatively deep tank 21 of considerably greater length than width, and approximately commensurate in longitudinal extent with the floor space occupied by a battery of oil presses, as shown in Figs. 1 and 2. In the embodiment here shown, and as seen to best advantage in Figs. 3 and 5, a longitudinal bulkhead or partition 30 is vertically disposed along the greater portion of the length of tank 21 but stops somewhat short of the tank end 31, to provide a channel having two parallel portions or chambers 32 and 33, of considerable length and substantial height but reduced width, the two chambers communicating with a common space 34 at the end 31 of said tank. The result achieved is that of a single long, narrow and deep channel doubled back upon itself in the manner of a jackknife, with its over-all dimensions such that conveniently the tank may be placed in vacant space usually available in mills employing these presses, and with its parts conveniently disposed for short and efficient conduits and conveyors. The bottom of chamber 33 is formed by walls 35 and 36 which converge and eventually meet to form a semi-cylindrical housing portion 37 shown as snugly encompassing the lower semicylindrical half of a slowly rotating worm conveyor 38 which is affixed to a shaft 39. The bottom of chamber 32 is similarly contoured, and likewise houses a worm 40 affixed to a shaft 41. The ends of shafts 39 and 41 project externally of said chamber and carry cooperating sprockets 42 and 43 driven by chains 44 and 45 from sprockets 46 and 47 fixed on a cross shaft 48. Attached to shaft 48 is another sprocket 49 driven by a chain 50 from a sprocket 51 attached to a shaft 52 of motor 53.

Figure 6:
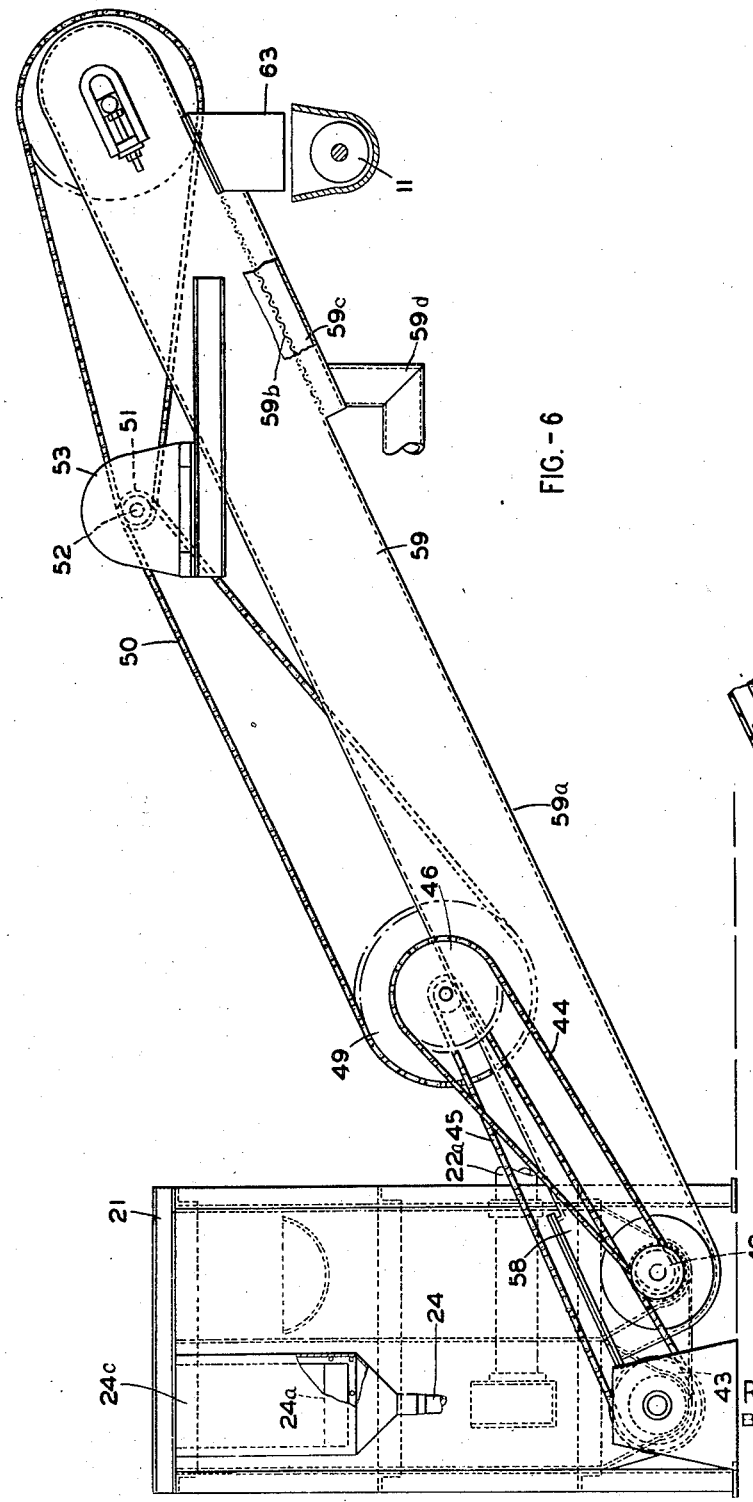
Fig. 6 is an end elevation of the settling tank and foots elevator.

Examination of Figs. 3 and 6 and the driving mechanism there shown indicates that shafts 39 and 41 are rotating in the same direction but that worms 40 and 38 are oppositely pitched and therefore disposed to urge material contacted thereby in opposite directions. As a consequence, any solid material settling between the blades of worm 40 (Fig. 3) is urged to the left into space 34 near the end 31 of the tank, and as soon as it accumulates therein to an extent sufficient to come in contact with worm 38 it is carried thereby to the end 54 of chamber 33.

Sprockets 42, 43 are connected, respectively, to their shafts 39, 41 through suitable yielding over-running clutches, such as indicated conventionally at 42a, 43a. With such an arrangement each shaft is driven when its driving sprocket is rotated in one direction only. Consequently, if the driving sprocket is stationary, the shaft may be loosely rotated in the forward direction, due to the over-running effect, without rotation of the sprocket. This clutch drive is made use of for freeing the shafts from the braking effect upon the worms of foots in the machine over a period when the machine is at rest. To that end each shaft is provided with suitable means for turning it by hand, such as a capstan ring 43b provided with one or more radial openings 43c into which a bar or lever 43d may be inserted. In starting the machine, if a worm is clogged with foots the bar is inserted into one of the capstan holes and the shaft is turned to loosen up the foots, thus taking the extra starting load off from the motor and permitting all parts to begin rotation at the same time.

The speed ratio of the sprocket driving mechanism for shafts 39, 41, as illustrated, is such as to drive shaft 39 faster than shaft 41. In practice, for example, shaft 39 may be rotated at approximately 9 or 10 R. P. M., while shaft 41 rotates from ¾ to 1½ R. P. M. The reason for this is the fact that the duty of shaft 39 is considerably greater than of shaft 41. Most of the foots settles quite promptly to the bottom of the tank in the neighborhood of the point where the oil is supplied to the tank, i. e., near the exit for the foots, and shaft 39 must be rotated fast enough to carry the foots into the elevator as fast as it is collected. Only a small proportion of the foots is collected in the other half of the tank, and the duty of shaft 41 is consequently much lighter and it need not rotate so fast.

As heretofore explained in connection with Figs. 1 and 2, the expressed oil and cooling oil coming together from the presses passes to a conveyor 19 and thence is elevated by suitable lifting means 20. From the elevator it is delivered by piping 55 into a receiving pan 56 whence it overflows directly into chamber 33. The oil flows to the left (Fig. 3) in chamber 33, transversely through chamber 34 and to the right in chamber 32, as indicated by arrows O which indicate the direction of oil travel.

At the discharge end of the channel the tank end wall is provided with an opening or notch of considerable width closed up to a desired level by a plate 24a detachably bolted in place. Several plates 24a of different heights may be provided so that by selection of the appropriate one the level of oil in the tank may be adjusted vertically. Such a plate, with its upper edge below the level of the side walls of the tank, forms a weir over the edge of which the oil flows into a chamber 24b in a housing 24c fastened to the end of the tank and to the bottom of which is connected the conduit 24. This arrangement not only permits the product oil to be discharged gently when the level of oil rises to that of the weir edge, but it also permits the discharge into the chamber 24b of foam or aerated oil, which otherwise usually collects on top of the bath of oil in the tank to such a degree as to flow over the side walls of the tank and run out upon the floor. Such foamy oil, with this arrangement, moves along with the main body of oil and is discharged as it forms, without loss.

By reason of the substantial height and longitudinal extent of the channel chambers 32 and 33, which are of a large volumetric capacity in proportion to the quantity of oil received and delivered per unit of time, and by reason of the multiplication of the distance traveled with respect to the floor space occupied, a high settling efficiency is secured, without undue sacrifice of floor space.

The cooling oil to be recirculated is withdrawn after traveling from 50% to 80% of the total length of the channel, with plenty of opportunity for settling of the major portion of the foots even when the quantity of cooling oil is fairly large. This cooling oil has been found to be much more free of foots than hitherto, with the result that the circulating piping, the cooler or heat exchanger and the oil distributing devices at the press barrels do not clog or block up, but give trouble-free performance.

The product oil which is finally withdrawn continues its travel over the remaining 50% to 20% of the total channel length, but of course at a greatly reduced rate of travel, due to its very much smaller volume as compared with the cooling oil. In practice the cooling oil may require from fifteen to forty-five minutes for passage through the channel, whereas the product oil flows so slowly during the final stage of its movement as to require from five to ten hours or more to pass through the channel. The product oil is therefore much more clear and free of foots.

In general a considerable improvement in average uniformity of the product is secured, since the chamber design and oil routing prevent entering oil from flowing immediately to the exit passage, as may easily happen with a large settling tank whose width and length are more nearly the same.

Figure 7:
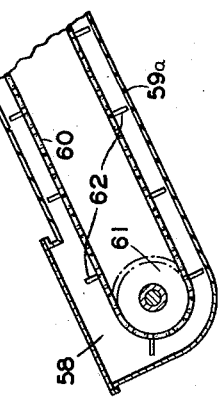
Fig. 7 is a detail section taken on the line 7—7 of Fig. 3.

The direction of travel of the foots is shown by arrows F, and is opposed to the direction of oil flow. This prevents any accumulation of foots at the end of the chamber where the oil is drawn off. The foots are moved by any suitable form of conveyor, such as a ribbon conveyor or the worms 40 and 38, to the end 54 of chamber 33, where they are ejected through a coupling conduit 57 into the receiving end 58 of a mechanical conveyor or drag elevator 59 (Figs. 6 and 7). This elevator comprises a continuous inclined conveyor tread 60 passing over sprockets 61 at its lower and upper extremities, said conveyor having projecting, transverse cleats 62 which drag the foots along the surface of the enclosing casing 59a to the upper portion of the conveyor, where they are discharged through a chute 63 (Figs. 1 and 6) into conveyor 11, to be thereby recharged into the presses 12, with the eventual purpose of being to a substantial extent incorporated in the oil-cake product which is discharged through conveyor 18 as already described. However, the floor of the casing 59a, near its upper end is usually provided with a screen 59b which permits a considerable proportion of the oil entrained with the foots to escape to a collecting trough 59c, from which a pipe 59d conducts it to the receiving pan 56 where it joins the oil being supplied to the settling tank.

As apparent from the above description the oil flows counter to the direction of travel of the foots, but little or no turbulence is occasioned thereby since, as apparent from Fig. 5, the location of the foots conveyor is remote from the large body of the oil, and the conveyor speed is so low that its disturbing effect is negligible. With a settling tank such as here shown a calculated average time of fifteen to forty-five minutes for the progress of an increment of oil from the point of entry to the point of discharge of cooling oil is sufficient to permit settling out of a greater proportion of the foots than has heretofore been eliminated by the considerably more expensive and troublesome screening process, and the further travel of the product oil over the remaining part of the channel so much the more clarifies and improves the final product, thus greatly reducing the necessity for filtering.

Figs. 1 and 2 of the drawings, in full lines, illustrate the invention applied to a battery of three presses located side by side, the settling tank extending along the space in front of the battery of presses. Preferably I so fabricate the settling tank, its supports, the conveyors in the bottom of the tank, and any other tank appurtenances, such as piping, etc., as to enable the settling system readily to be accommodated to any desirable increase in the number of presses in the battery. For example, at the left in Figs. 1 and 2 I illustrate in dotted lines a fourth press which it is desirable to add to the battery. To accommodate such a desire the settling tank, conveyor parts, etc., mentioned are built in sections each of a length corresponding to the spacing, center to center, of the presses. One common spacing between presses is eight feet. In that case the sections of the tank, conveyors, etc., are made eight feet long, with provision for convenient connection of sections end to end along the lines of separation indicated at 70. The tank parts may have flanges adapted to be bolted together and the conveyors, when of worm form, may be made of sections secured to each other end to end. Thus, when it is desired to add a new press to the battery, a new intermediate section of tank conveyors, etc., is purchased; the end section including the chamber 34 is disconnected and moved over eight feet; the new intermediate section is inserted in place; and the parts are fastened together with proper rearrangement of driving means, piping, etc., to produce an operative structure as before.

With such an arrangement, of course, the volume of oil to be handled is increased not only by the amount necessary for cooling the additional press but also by the oil product of that press. But the inserted additional tank section will accommodate and hold such increased volume of oil and further increases the total length of channel to be traversed by the streams not only of cooling oil, but of final product oil. The consequence is that the system operates with substantially uniform results regardless, within reason, of the total number of presses served thereby.

What I claim is:

1. Apparatus of the character described, comprising a screw press including a foraminous barrel and a pressure screw therein for expressing oil from proteinaceous material and thereby producing solid cake and oil having solid matter suspended therein, in combination with oil clarifying means, such means including an elongated tank having a channel of large capacity as compared with the expressed oil product of said press, means for collecting oil drained from the press barrel and for introducing it into one end of said tank channel, means for withdrawing oil from a point intermediate the ends of said channel, for cooling such oil, and for applying the same to the outside of the press barrel, means at the other end of said channel for withdrawing product oil, and means for moving the settled solid matter along the channel in a direction counter to that of oil flow, said channel being divided into two halves lying side by side with the channel portions in the two halves communicating at one end of the tank, and the oil receiving and discharge ends of the channel lying adjacent each other at the other end of the tank.

2. Apparatus of the character described, comprising a battery of like screw presses located side by side in spaced relation, each thereof including a foraminous barrel and a pressure screw therein for expressing oil from proteinaceous material and thereby producing solid cake and oil having solid matter suspended therein, in combination with oil clarifying means, such means including an elongated tank located to extend along the end of the battery of presses and having a channel of large capacity as compared with the total oil expressed by all of the presses in the battery, means for collecting the oil drained from all press barrels and for introducing it into one end of said channel, means for withdrawing oil at a point removed from said channel end a distance equal to from fifty per cent to eighty per cent of the total length of said channel, means for cooling such oil, means for distributing the same to all press barrels, and means at the other end of said channel for withdrawing product oil, said elongated channel being divided into two halves lying side by side with the channel portions in the two halves communicating at one end of the press battery, and the oil receiving and discharge ends of the channel lying adjacent each other at the other end of the battery.

3. Apparatus of the character described, comprising a battery of like screw presses located side by side in spaced relation, each thereof including a foraminous barrel and a pressure screw therein for expressing oil from proteinaceous material and thereby producing solid cake and oil having solid matter suspended therein, in combination with oil clarifying means, such means including an elongated tank located and extending along the end of the battery of presses and having a channel of large capacity as compared with the total oil expressed by all of the presses in the battery, means for collecting the oil drained from all press barrels and for introducing it into one end of said channel, means for withdrawing oil at a point removed from said channel end a distance equal to from fifty per cent to eighty per cent of the total length of said channel, for cooling such oil, and for distributing the same to all press barrels, and means at the other end of said channel for withdrawing product oil, said elongated tank being divided into two halves lying side by side with the channel portions in the two halves communicating at one end of the press battery, and the oil receiving and discharge ends of the channel lying adjacent each other at the other end of the battery, said tank being made in sections connected end to end, each of a length corresponding to the spacing center to center between presses, whereby upon the addition of a press to the battery the tank may be correspondingly increased in length by the insertion of an intermediate section.

RAYMOND T. ANDERSON.